United States Patent
Campbell et al.

(10) Patent No.: US 6,421,229 B1
(45) Date of Patent: Jul. 16, 2002

(54) COMBINATION METER/BREAKER PANEL ENCLOSURE WITH RAIN GUTTER AND SECURITY SYSTEM

(75) Inventors: James M. Campbell, Atlanta; Jeffrey J. Johnson; Syed M. Karim, both of Lincoln, all of IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/742,608

(22) Filed: Dec. 21, 2000

(51) Int. Cl.⁷ .................................................. H02B 1/26
(52) U.S. Cl. ........................ 361/622; 361/641; 361/659
(58) Field of Search .............................. 174/39, 48, 50; 361/600, 601, 622, 627–628, 634, 641, 659–671; 324/110, 156

(56) References Cited

U.S. PATENT DOCUMENTS

| | | | |
|---|---|---|---|
| 3,675,085 A | * 7/1972 | Stanback | 361/641 |
| 3,707,653 A | * 12/1972 | Coffey et al. | 361/622 |
| 4,289,361 A | * 9/1981 | Riedel | 361/660 |
| 5,310,075 A | * 5/1994 | Wyler | 361/641 |
| 5,638,256 A | * 6/1997 | Leach et al. | 361/61 |
| 6,046,904 A | * 4/2000 | Kubat | 361/659 |

* cited by examiner

Primary Examiner—Gregory Thompson
(74) Attorney, Agent, or Firm—Martin J. Moran (57) ABSTRACT

A meter/breaker arrangement having separate covers for the meter side and breaker side. The meter side includes as an extension thereof a rain gutter which underlaps a flange on the breaker cover to provide a rain-proof or water-proof enclosure when both covers are disposed securely on the enclosure. In addition, a locking arrangement is provided so that the breaker cover can be removed without allowing access to the meter region. Alternatively, both the meter cover and breaker cover can be removed. A flexible, partially non-electrically conductive, security member is provided for separating the meter side from the breaker side.

9 Claims, 9 Drawing Sheets

COMBINATION METER/BREAKER PANEL ENCLOSURE WITH RAIN GUTTER AND SECURITY SYSTEM

BACKGROUND OF THE INVENTION

1. Field of the Invention

The subject matter of this invention relates generally to electrical distribution combination circuit breaker meter system panels or enclosures for outdoor use having a rain gutter and an isolation barrier.

2. Description of the Prior Art

Figure 1:
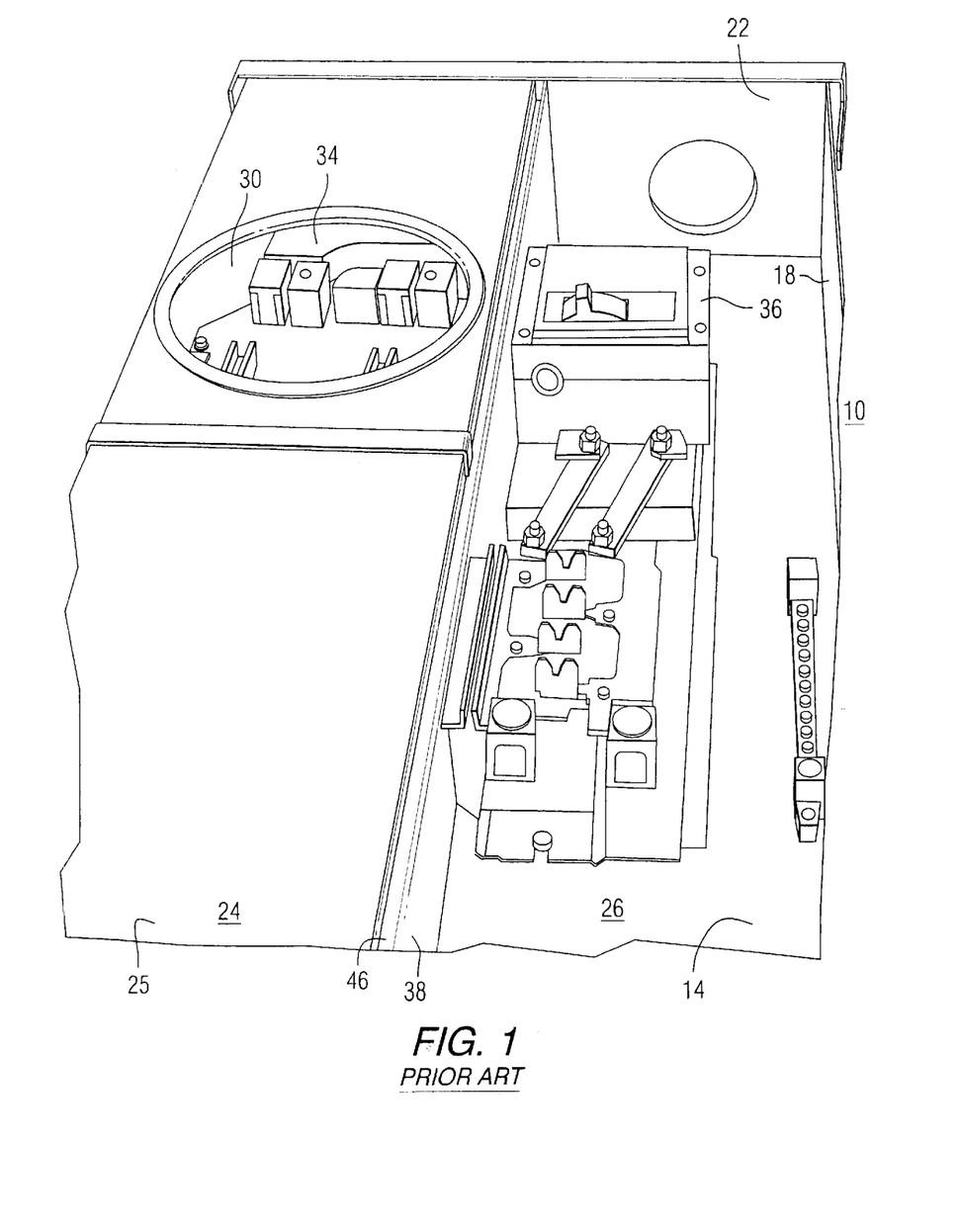
FIG. 1 shows a 3-dimensional orthogonal view of a prior art meter breaker enclosure system with the breaker cover removed.
Figure 2:
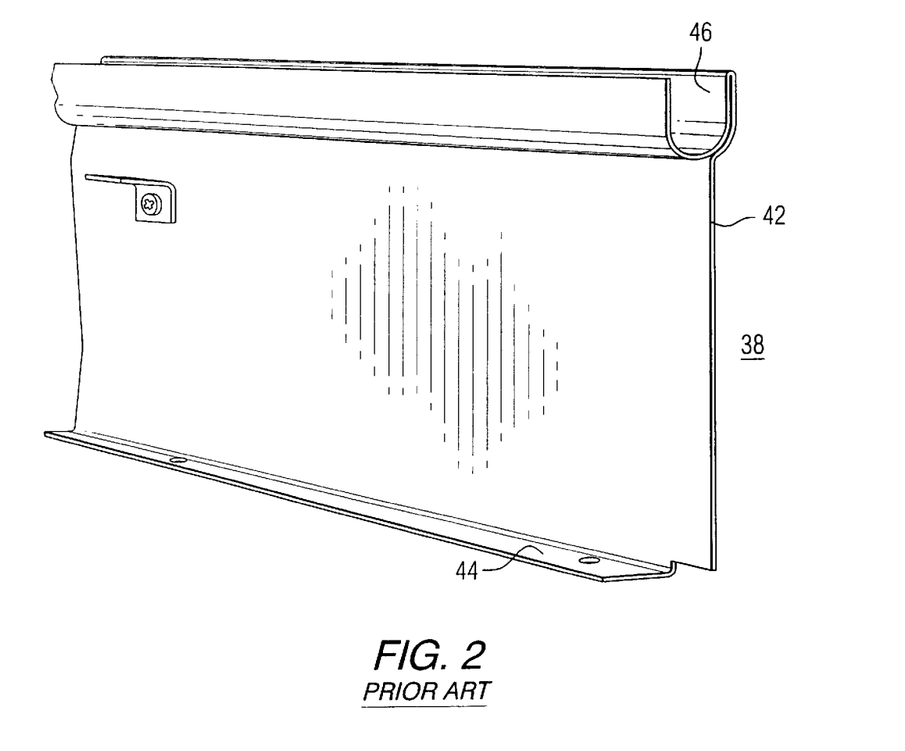
FIG. 2 shows a prior art isolator and gutter assembly for utilization in the prior art embodiment of FIG. 1.
Figure 3:
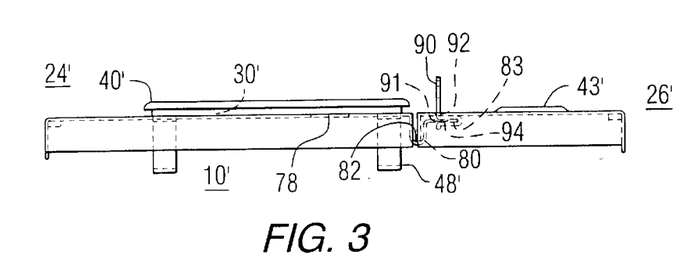
FIG. 3 shows a bottom view of an arrangement of a combination of covers embodying the teachings of the present invention.
Figure 4:
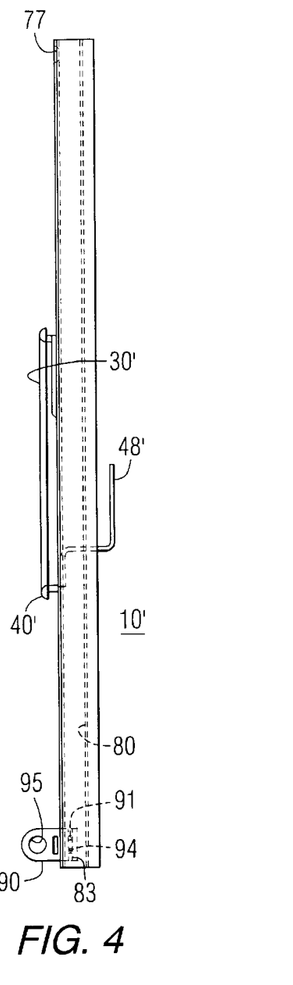
FIG. 4 shows a side elevation of the arrangement shown in FIG. 3.

The prior art is depicted in FIGS. 1 and 2. In particular, the prior art includes a meter/breaker enclosure 10 having an enclosure backplate 14 and an enclosure right side wall 18, for example. There is also provided a top wall 22. The enclosure system 10 is divided into a meter side 24 on the left and a breaker side 26 on the right as depicted in FIG. 1. On the meter side is disposed a meter side cover 25 having a meter opening 30 therein. There is provided against the back plate 14 on the meter side 24 a meter socket 34. There is provided on the back plate 14 on the breaker side 26 a breaker 36.

Referring also to FIG. 2, it is desirous to separate the breaker 36 from the meter socket region 34. In order to do this, in the prior art, the combination isolator and gutter assembly 38 is provided which includes a crowning gutter portion 46 on top of an elongated isolator gutter support wall 42 which is secured by way of a gutter support mounting flange 44 to the back plate or back wall 14 of the enclosure 10.

The prior art construction has a disadvantage. That disadvantage lies in the fact that the combination isolator and gutter assembly 38 is a separately manufactured piece requiring separate manufacturing process step and a separate attachment process step. Furthermore, the aforementioned arrangement does not lend itself to cover and isolator support security in a manner thought to be necessary.

It would be advantageous if a circuit breaker meter enclosure system could be uncovered which includes an easily manufactured cover gutter and isolator arrangement with enhanced security between the breaker section and the meter section.

SUMMARY OF THE INVENTION

In accordance with the invention an electrical center is taught which includes an enclosure and a first cover for the enclosure and a second cover for the enclosure. Both the first and second covers are mounted on the enclosure. The first cover and the second cover abut at an abutting region and the first cover has an integral gutter, which is disposed at the abutting region. A first locking arrangement is provided between the first cover and the second region. In an embodiment of the invention the first cover communicates with the meter region and the second cover communicates with the breaker region. The second cover has a flange, which is disposed axially, overlappingly into the integral gutter. The first cover and second cover are:locked together by the convenient first locking arrangement such that the second cover can be removed independently first from the enclosure of the first cover. The first cover has a separate second locking arrangement such that the first cover cannot be removed from the enclosure without opening the second key lock arrangement. However, by unlocking the second key lock arrangement the first cover and the second cover can both be removed simultaneously while the first locking arrangement remains in place.

BRIEF DESCRIPTION OF THE DRAWINGS

In accordance with the present invention, reference may be had to the preferred embodiment thereof shown in the accompanying drawings in which.

DESCRIPTION OF THE PREFERRED EMBODIMENT

Referring now to the Drawings, a combination meter circuit breaker center or enclosure 10' is depicted. Centers of this kind are advantageously utilized in trailer parks and the like for providing a meter reading capability for the individual trailer as well as a circuit breaker which acts as a main circuit breaker for the individual trailer. This arrangement is almost always used in an outdoor environment subject to weather. Therefore it is necessary to remove or vector water as quickly as possible away from the enclosure arrangement so as not to detrimentally affect the electrical equipment disposed therein. In addition, it is necessary to provide a security arrangement between the meter side and the breaker side of the enclosure. Typically, a landlord or tenant may desire to go into the breaker region for purposes of changing out or replacing breakers or performing maintenance on breakers, but utility companies desire that there be no separate access other than by utility company personnel to the meter arrangement on the other side. Consequently, the isolator arrangement must provide security between the breaker side and the meter side of the enclosure and the meter cover cannot be removable except by utility company personnel.

As was clearly depicted and described in the Background of the Invention with respect to FIGS. 1–2 a prior art arrangement exists for which a desirable and upgraded replacement is sought.

In the embodiments of the invention to be described hereinafter like reference characters represent like arrangements or similar arrangements between the embodiments of the present invention and the prior art. In situations where improvements have been provided or a difference made, such is by indicated a prime (').

Referring now in particular to FIGS. 3–12, a preferred embodiment of the invention is depicted. There is provided an improved meter-breaker enclosure system 10' in which is provided a back plate or plane 14' and a right side enclosure wall 18. There is also provided a top wall 22'. On the left is depicted an improved meter side 24' and on the right is depicted an improved breaker side 26'. An improved meter side cover 25' is provided on the left or meter side and an improved breaker side cover 27' is provided on the right or breaker side. There is provided a meter opening hole 30' through which a meter socket 34 may be seen. The meter opening hole 30' may include a hole lip 40', which may be useful for routing water away from a meter glass enclosure, which protrudes outwardly through the hole 30', when the meter is securely in place in the meter region 24'. There is provided on the right a breaker handle opening 43' through which may protrude a breaker handle 84' which may cooperate with a breaker such as 36 shown in the prior art arrangement of FIG. 1. The meter side cover 25' may be secured to the back plate 14' by way of two downwardly dependent legs 48' which space the cover from the back plate and act as securement devices. There also may be provided a new and improved isolator system 60 which may Include a secure electrically conductive bottom separator portion 62 and a secure electrically conductive top separator portion 64 bracketing or supporting therebetween a flexible non-electrically conducting middle separator portion 66. The middle separator portion provides electrical insulation protection between the closely spaced contacts on the meter arrangement and the breaker arrangement. In addition to being electrically insulating a material may be used for the middle portion which is difficult to puncture or otherwise destroy so to maintain the integrity of the security isolation between the meter region and the breaker region. There is provided and formed as part of the cover 25' a u-shaped rain gutter 80 which is integral to the cover 25'. On the upper portion of the gutter arrangement 80 is provided. a meter cover gutter upper flange 70 and on the bottom portion is provided a meter cover gutter lower flange 83 the purposes of which will be described hereinafter. The gutter is basically u-shaped as indicated at 82 so that as water collects in the region of the gutter it is conveniently vectored away from the meter-breaker system 10' to thus maintain high electrical operating characteristics.

Figure 9:
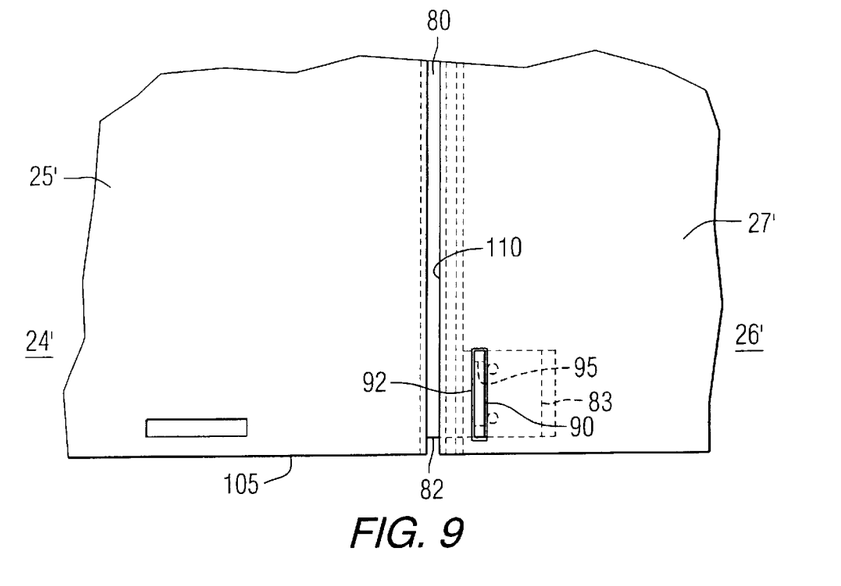
FIG. 9 shows a broken away-enlarged portion of the elevation of FIG. 5 in the lower central region thereof.
Figure 10:
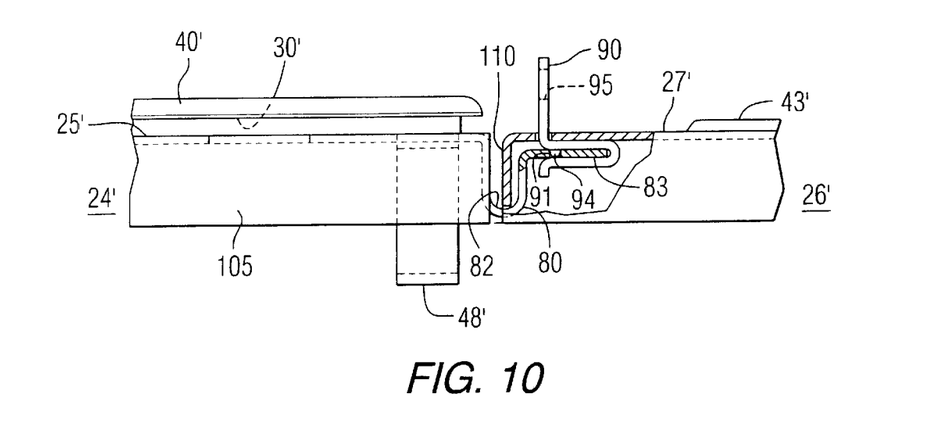
FIG. 10 shows a broken away-enlarged portion of the construction features shown in FIG. 3 in the bottom central region thereof.

By referring to FIGS. 9–10 it can be seen that the interaction of the meter cover 25' and the breaker cover 26' provides an improved construction. In particular. the downwardly protrudingly left side breaker cover lip 110 overlaps and protrudes downwardly into the u-shaped region 82 of the gutter 80 in such a manner as to provide a weather secured arrangement between the cover 25' and the cover 27'.

Water which may collect on the face of either the cover 27' or 25' will be channeled into the bottom most portions of the u-shaped member 80 and downwardly away from the abutting covers.

Figure 5:
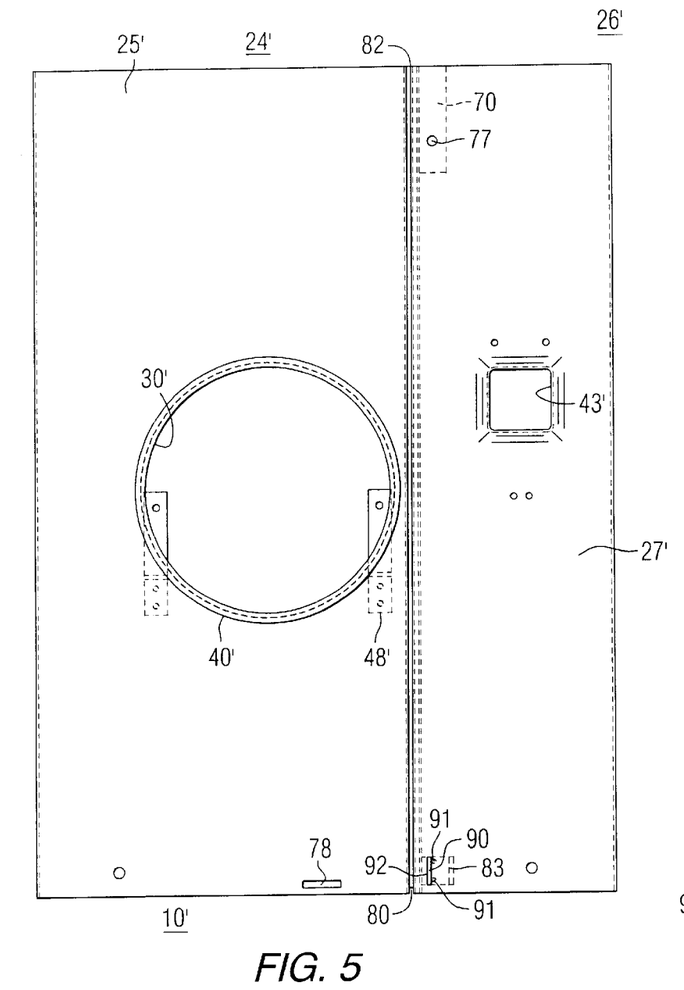
FIG. 5 shows a front elevation of the arrangement shown in FIGS. 3–4.
Figure 6:
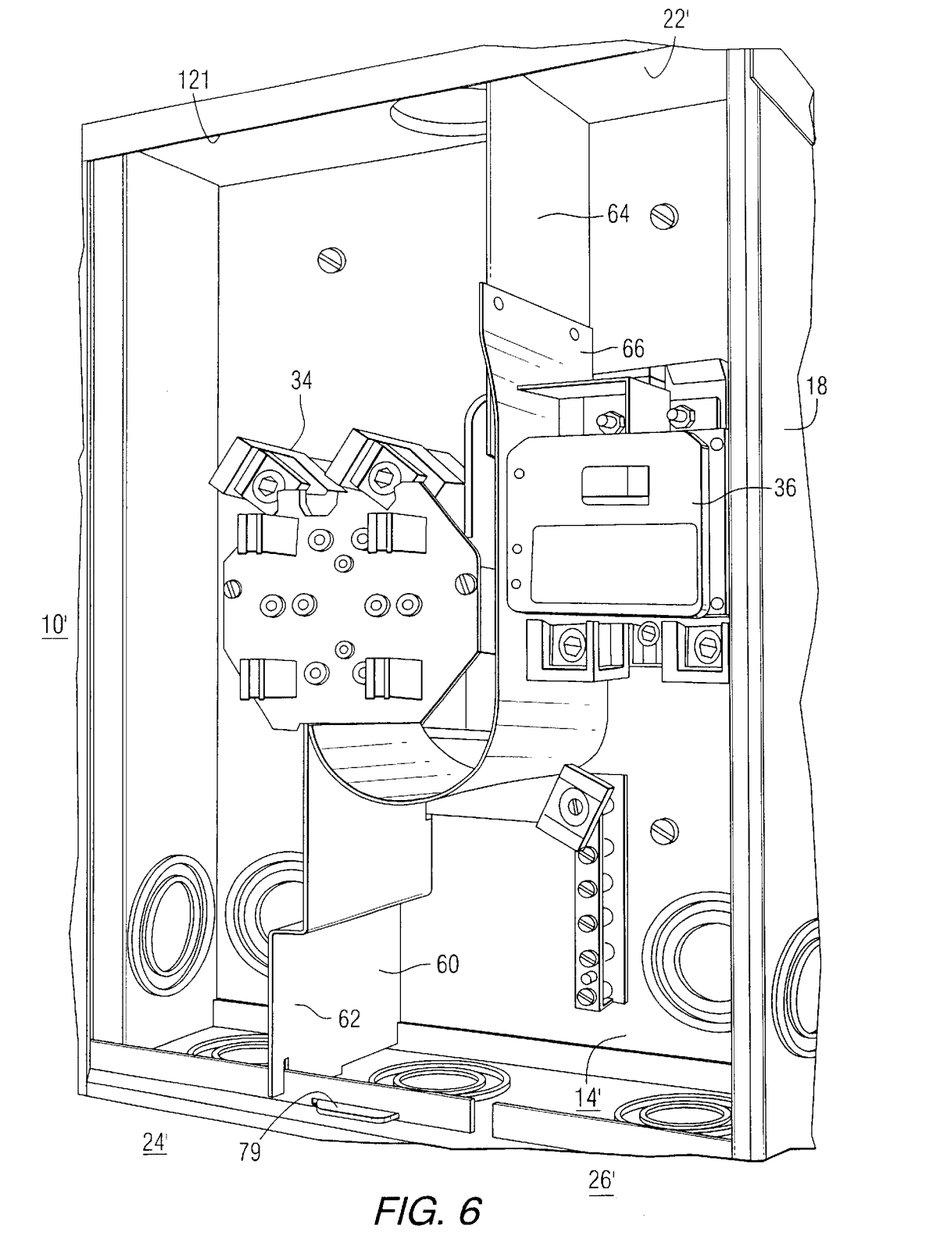
FIG. 6 shows an orthogonal view of the internal portion of the enclosure upon which the covers of FIGS. 3–5 are disposable.
Figure 7:
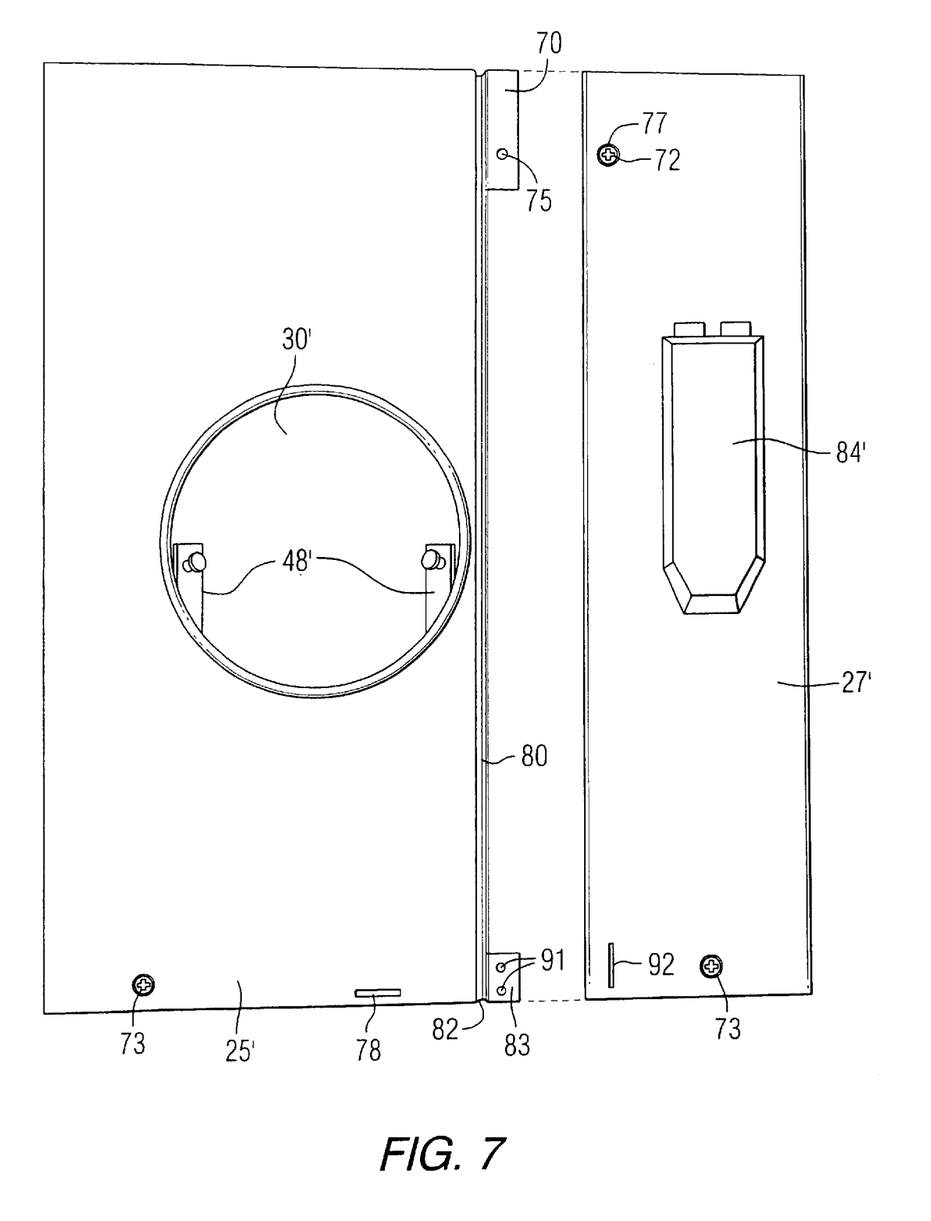
FIG. 7 shows a side by side juxtaposition of the meter cover and breaker cover in disassembled relationship similar to the depiction shown in FIG. 5 in the connected relationship.
Figure 8:
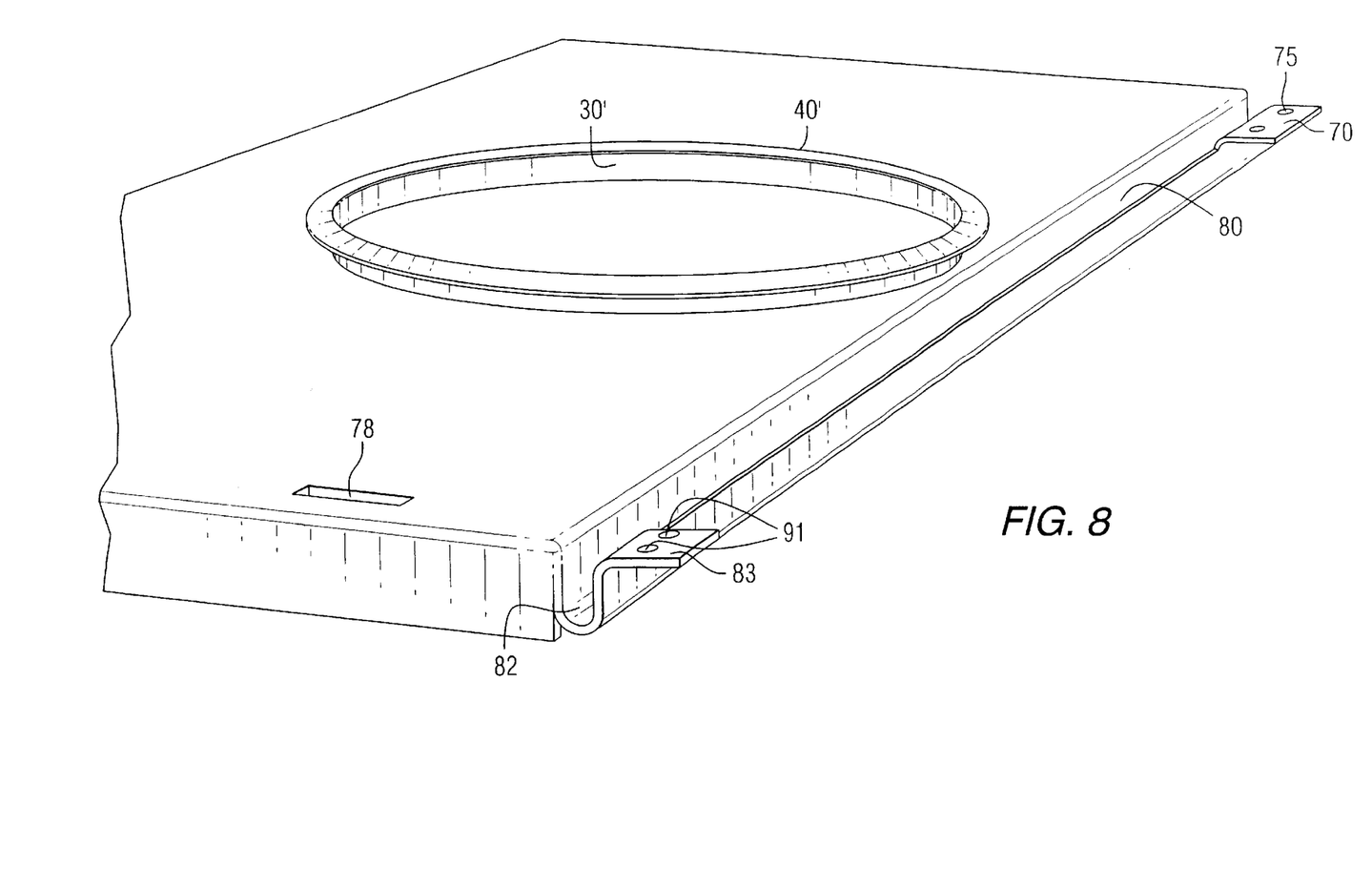
FIG. 8 shows a broken away orthogonal view of the meter cover of FIG. 7 highlighting the integral gutter extension thereof.

Referring to FIG. 5, in securing the cover 27' to the cover 25' a novel security arrangement is provided. In particular, the cover 27' has a screw hole or opening 77 in the upper left portion thereof, which abuts or aligns with a screw hole 75 (see FIG. 8) in the cover gutter upper flange 70 of the cover 25'. Once the covers have been joined as shown in FIG. 5, a screw 72 (see FIG. 12) secures the cover 27' to the flange 70. The bottom flange 83 includes two holes or openings 91. A meter cover to breaker cover lock hasp with pins 90 is provided which is securely anchored on the flat surface of the gutter flange 83 and which has pins 94 which protrude downwardly into the holes 91 to lock the hasp into place on the flange 83. As the cover 27' is placed in association with the cover 25' the hasp 90 protrudes upwardly through a meter cover to breaker cover lock hasp slot 92 in the breaker cover 27'.

Figure 11:
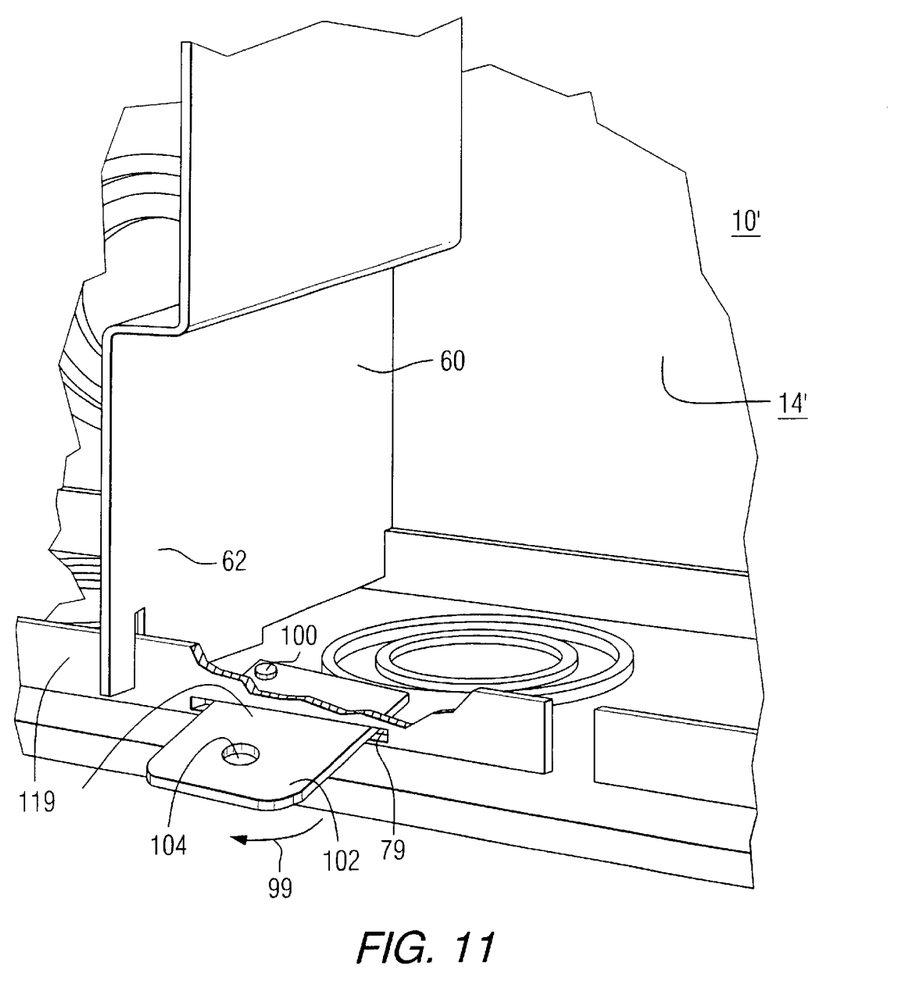
FIG. 11 shows a broken away portion and enlarged in the lower central region of the embodiment shown in FIG. 6 with a movable hasp lock tab.
Figure 12:
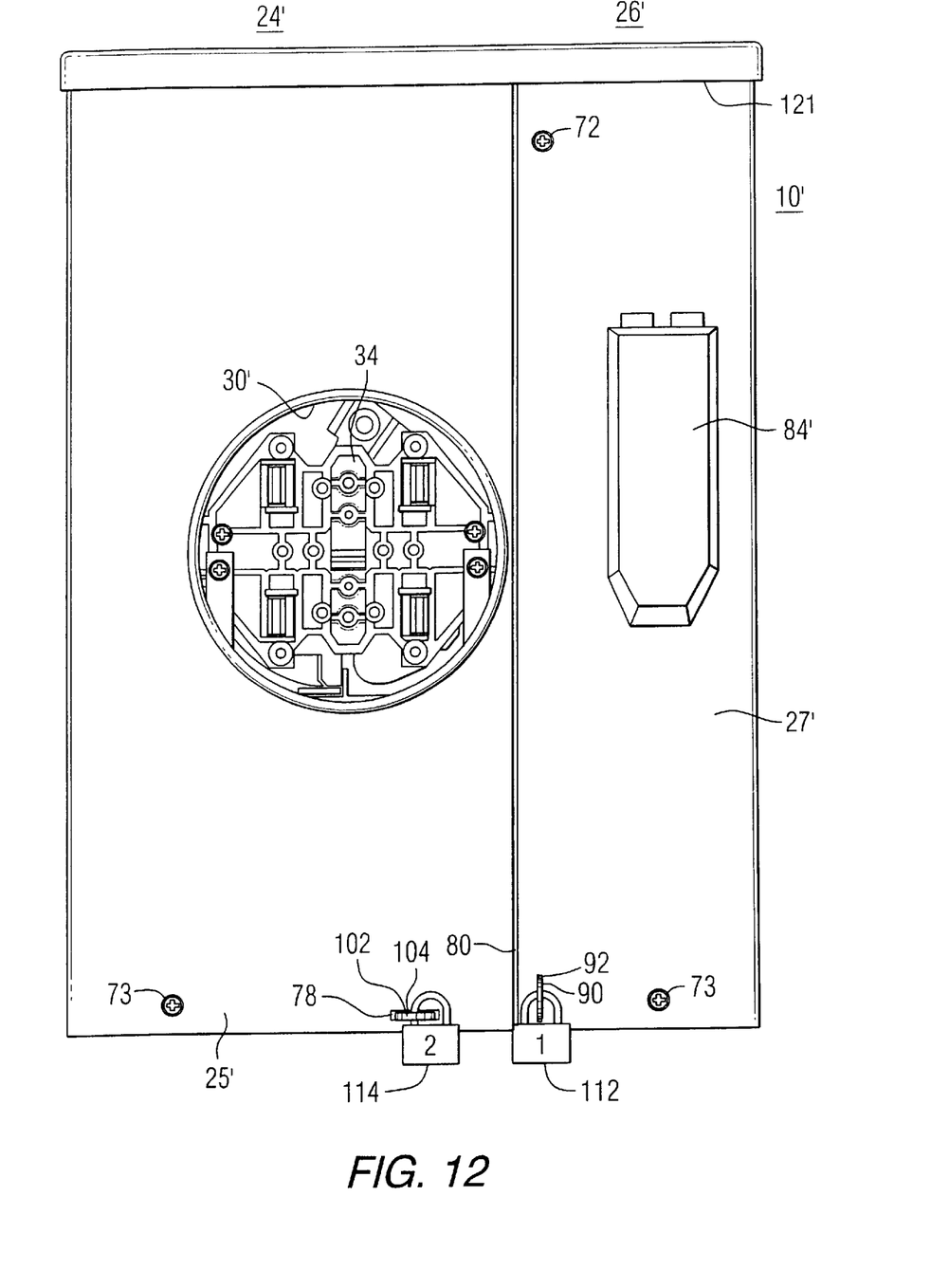
FIG. 12 shows a front elevation of a completely assembled meter/breaker enclosure system with gutter and security locks in place.

Referring additionally to FIGS. 11–12, further construction features of the present invention are depicted. In particular, in the bottom side flange 119 of the bottom sidewall of the enclosure 10' is disposed a meter base hasp slot 79. This is utilized in conjunction with a hasp lock tab 102 which may be rotated outwardly upon a rivet 100 in the assembly 10' through the slot 79 in the rotational direction 99 to protrude through a meter side cover lock hasp slot 78 in the meter cover 25'.

Consequently, as shown in FIG. 12 a lock may be utilized in conjunction with hasp 90 to secure the breaker cover 27' in an abutting arrangement in a flange to u-shaped trough securement to the meter cover 25'. Both covers as now joined may be fit into a region under lip 121 of the enclosure 10' and then securely screwed down to the base of the enclosure by screws 73. In doing so, the hasp 102 will protrude through the hasp slot 78 in the cover 25' to be locked there against by way of a locking arrangement 114.

Thus, it can be seen that cover 27 may be removed by loosening screws 72 and 73 and unlocking lock 112 and removing it from hasp 90 so that the cover may be moved outwardly and downwardly exposing the circuit breaker region 26'. However, because the lock 114 remains in lace in the hasp 102, a separate key is required to remove the meter cover 25' from the overall assembly 10'. Generally, only power company personnel are given access to this latter lock and key. However, it is to be noted that if this lock 114 is unlocked and if the screws 73, as described previously, are removed. Both covers 25' and 27' may be removed simultaneously exposing the entire inner portion of the assembly 10' including both the breaker side and the meter side.

What is claimed:

1. A meter center, comprising:
   an enclosure, said enclosure having a breaker region and a meter region therein;
   a first cover for said enclosure, said first cover being mounted on said enclosure, said first cover covering said meter region;
   a second cover for said enclosure, said second cover being mounted on said enclosure, said second cover covering said breaker region;
   said first cover and said second cover abutting at an abutting region;
   said first cover having an integral gutter, said gutter being disposed proximate said abutting region;
   wherein said second cover is locked to said first cover but not to said enclosure, said second cover being unlockable from said first cover, to be opened independently of said first cover to expose said breaker region but not said meter region;
   said first cover being separately locked to said enclosure, said first cover being unlockable from said enclosure to be opened when said second cover is locked thereto to expose said breaker region and said meter region; and isolator means disposed within said enclosure between said breaker region and said meter region for preventing access to said meter region from said breaker region when said second cover is in the open state while said first cover remains in said locked state, said isolator means comprising , a bottom separator portion, a top separator portion and an intermediate, offset, flexible, non-electrically conductive, middle separator portion joined to the bottom separator portion and the top separator portion.

2. The meter center of claim 1, wherein said second cover has a portion which overlaps said gutter.

3. The combination as claimed in claim 1 wherein said top and bottom separator portions are electrically conductive.

4. A meter-breaker center, comprising:

an enclosure, said enclosure having a breaker region and a meter region therein;

a first cover for said enclosure, said first cover being mounted on said enclosure, said first cover having a first cover opening therein communicating with one of said breaker region and said meter region;

a second cover for said enclosure, said second cover being mounted on said enclosure, said first cover and said second cover being generally disposed in the same plane;

said second cover having a second cover opening therein communicating with the other of said breaker region and said meter region;

said first cover and said second cover abutting at an abutting region generally along a straight line;

said first cover having an integral u-shaped gutter disposed along said straight line, wherein said second cover has an edge, wherein said edge overlaps said gutter; and isolator means disposed within said enclosed between said breaker region and said meter region for preventing access to said meter region from said breaker region, said isolator means comprising, a bottom separator portion, a top separator portion and an intermediate, offset, flexible, non-electrically conductive, middle separator portion joined to the bottom separator portion and the top separator portion.

5. The combination as claimed in claim 4 wherein said top and bottom separator portions are electrically conductive.

6. A meter-breaker center, comprising:

an enclosure, said enclosure having a breaker region and a meter region therein;

a first cover for said enclosure, said first cover being mounted on said enclosure, said first cover having a first cover opening therein communicating with said meter region;

a second cover for said enclosure, said second cover being mounted on said enclosure, said second cover having a second cover opening therein communicating with said breaker region;

said first cover and said second cover abutting at an abutting region;

said second cover being locked to said first cover but not to said enclosure, said second cover being unlockable from said first cover to be opened independently of said first cover to expose said breaker region but not said meter region;

said first cover being locked to said enclosure, said first cover being unlockable from said enclosure to be opened with said second cover to expose said breaker region and said meter region; and isolator means disposed within said enclosure between said breaker region and said meter region for preventing access to said meter region from said breaker region when said second cover is in the open state while said first cover remains in said locked state, said isolator means comprising, a bottom separator portion, a top separator portion and an intermediate, offset, flexible, non-electrically conductive, middle separator portion joined to the bottom separator portion and the top separator portion.

7. The meter center of claim 6, wherein said first cover has an integral gutter, said gutter being dispose proximate said abutting region.

8. The meter center of claim 7, wherein said second cover has a portion which overlaps said gutter.

9. The combination as claimed in claim 6 wherein said top and bottom separator portions are eclectically conductive.

* * * * *

UNITED STATES PATENT AND TRADEMARK OFFICE
CERTIFICATE OF CORRECTION

PATENT NO. : 6,421,229 B1
DATED : July 16, 2002
INVENTOR(S) : James M. Campbell, Jeffrey L. Johnson and Syed M. Karin It is certified that error appears in the above-identified patent and that said Letters Patent is hereby corrected as shown below:

Title page,
Item [75], Inventor, delete "Jeffery J. Johnson" and insert -- Jeffery L. Johnson --.

Signed and Sealed this

Fourth Day of March, 2003

JAMES E. ROGAN
*Director of the United States Patent and Trademark Office*